(12) United States Patent
Zuzelo

(10) Patent No.: US 7,832,321 B1
(45) Date of Patent: Nov. 16, 2010

(54) CUTTING BLADE FOR PRODUCING A TAPAZOIDAL GROOVE IN PAVEMENT AND ITS ASSOCIATED METHOD OF MANUFACTURE

(76) Inventor: Edward A. Zuzelo, P.O. Box 450, Conshohocken, PA (US) 19428

( * ) Notice: Subject to any disclaimer, the term of this patent is extended or adjusted under 35 U.S.C. 154(b) by 72 days.

(21) Appl. No.: 11/906,335

(22) Filed: Oct. 2, 2007

(51) Int. Cl.
*B27B 33/02* (2006.01)
(52) U.S. Cl. .......................................... 83/855; 407/60
(58) Field of Classification Search ........... 83/853–855; 407/60, 61, 62; 125/15; 451/548; 299/39.3
See application file for complete search history.

(56) References Cited

U.S. PATENT DOCUMENTS

| | | | |
|---|---|---|---|
| 3,924,318 A * | 12/1975 | Baker | 407/60 |
| 3,945,289 A * | 3/1976 | Baez Rios | 83/853 |
| 4,267,814 A * | 5/1981 | Benson et al. | 125/15 |
| 5,311,705 A | 5/1994 | Zuzelo | 51/206 |

* cited by examiner

*Primary Examiner*—Sunil Singh
(74) *Attorney, Agent, or Firm*—LaMorte & Associates

(57) ABSTRACT

A cutting tooth element for a cutting blade. The cutting tooth element has a body. The body has a forward surface, a rearward surface and a peripheral edge surface that extends from the forward surface to the rearward surface. The peripheral edge surface has a constant width that is equal to the width at the bottom of the groove that is to be cut. The body of each cutting tooth has a thickened area between its forward surface and rearward surface. The thickened area has a maximum width equal to the width at the top of the groove that is to be cut. The body has sloped side surfaces that extend from the thickened area to the forward surface, rearward surface and the peripheral edge surface. The resulting shape of the cutting tooth causes the cutting tooth to retain its cutting profile as it wears.

7 Claims, 4 Drawing Sheets

CUTTING BLADE FOR PRODUCING A TAPAZOIDAL GROOVE IN PAVEMENT AND ITS ASSOCIATED METHOD OF MANUFACTURE

BACKGROUND OF THE INVENTION

1. Field of the Invention

The present invention relates to cutting blades that are designed to cut into pavement materials, such as concrete and asphalt. More particularly, the present invention relates to blades that cut grooves into pavement that are wider at the top than at the bottom.

2. Prior Art Description

Most all paved surfaces are impervious to water. Consequently, any low-point or depression in a paved surface has the potential to cause puddling during a rain storm. If the paved surface is an airport runway, for example, such puddling can be extremely dangerous. If the wheels of an airplane roll through a puddle during takeoff or landing, the wheels of the airplane can hydroplane. This can cause the airplane to turn on the runway and/or prevent an airplane from stopping or reaching takeoff speeds prior to the end of a runway.

It is for these reasons that many airports cut grooves into the surfaces of the paved runways. According to U.S. federal safety regulations, runway grooves should be ¼ inch wide, inch deep and should be spaced less than two inches apart. In theory, the grooves provide flow channels for water. Any water on the runway should flow into the grooves and should flow to the sides of the runway. This prevents puddles from forming on the paved surface.

Traditionally, grooves are cut into the pavement of a runway using a standard diamond embossed cutting blade. The cutting teeth on the blade have a uniform thickness. Consequently, when the blade cuts into the pavement it produces a groove that has a rectangular cross-sectional profile.

Grooves with rectangular cross-sectional profiles have sharp edges at the top of the groove. These top edges tend to chip and wear when contacted by airplane wheels, snow plows and other vehicles. Furthermore, wear due to freeze-thaw cycles and other weathering also causes these corners to chip and fall away. The chipped material from the top edge of a rectangular groove falls into the groove, therein causing small obstructions. These small obstructions catch dirt, tire rubber and other debris. Soon, the groove is clogged and cannot effectively channel water. The grooving then becomes ineffective and dangerous puddling can occur.

To prevent grooves from becoming clogged with debris, many airports perform runway cleaning as part of their periodic maintenance schedule. Cleaning removes collected debris from the grooves so that the grooves maintain their ability to channel water. The cost of cleaning runways is substantial in terms of both labor and equipment. Furthermore, the runways of an airport must be periodically closed during cleaning maintenance.

In the prior art, attempts have been made to produce grooves that do not have rectangular shaped cross-sectional profiles. If a groove can be made with sloped sides, then the sharp top edge can be eliminated. This would cause less wear, less debris and therefore would reduce the need for maintenance.

In U.S. Pat. No. 5,311,705 to Zuzelo, entitled Contoured Cutting Tool, a blade is shown having teeth with a triangular profile. Such blades do initially create a groove in pavement that is V-shaped. However, the shape of the cutting teeth causes the cutting teeth to wear unevenly. Consequently, after a short time, the shape of the groove being cut changes and eventually returns to a rectangular shape. The cutting blades must therefore be replaced very often during cutting. Since the blades contain diamond dust and are very expensive, the cost of cutting non-rectangular grooves soon becomes cost prohibitive.

A need therefore exists for a pavement cutting blade that can cut a non-rectangular groove, yet does not wear rapidly. In this manner, shaped grooves can be cut into airport runway pavement in an economically efficient manner. This need is met by the present invention as described and claimed below.

SUMMARY OF THE INVENTION

The present invention is the cutting tooth configuration for a circular blade, the resulting blade and the method of cutting a groove using the invented blade. The purpose of the present invention is to provide an effective and economical means for cutting a groove in pavement where the top of the grove is significantly wider than the bottom of the groove. To accomplish this goal, a new cutting tooth element is provided. The cutting tooth element has a body comprised, at least in part, of a diamond impregnated metal. The body has a forward surface, a rearward surface and a peripheral edge surface that extends from the forward surface to the rearward surface. The peripheral edge surface has a constant width that is equal to the width at the bottom of the groove that is to be cut.

The body of each cutting tooth has a thickened area between its forward surface and rearward surface. The thickened area has a maximum width equal to the width at the top of the groove that is to be cut. The body has sloped side surfaces that extend from the thickened area to the forward surface, rearward surface and the peripheral edge surface. The resulting shape of the cutting tooth causes the cutting tooth to retain its cutting profile as it wears. A trapezoidal shaped groove can, therefore, be cut by the blade and maintained as the cutting teeth wear.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention can be used to cut a groove with a trapezoidal cross-section into any surface, such as a roadway or a parking lot, it is particularly well suited for grooving the pavement of an airport runway. Accordingly, the present invention will be described in the application of cutting grooves in an airport runway in order to present the best mode contemplated for the invention. However, it should be understood that the present invention blade can be used for other applications and its use in cutting the pavement of a runway should not be considered a limitation.

Figure 1:
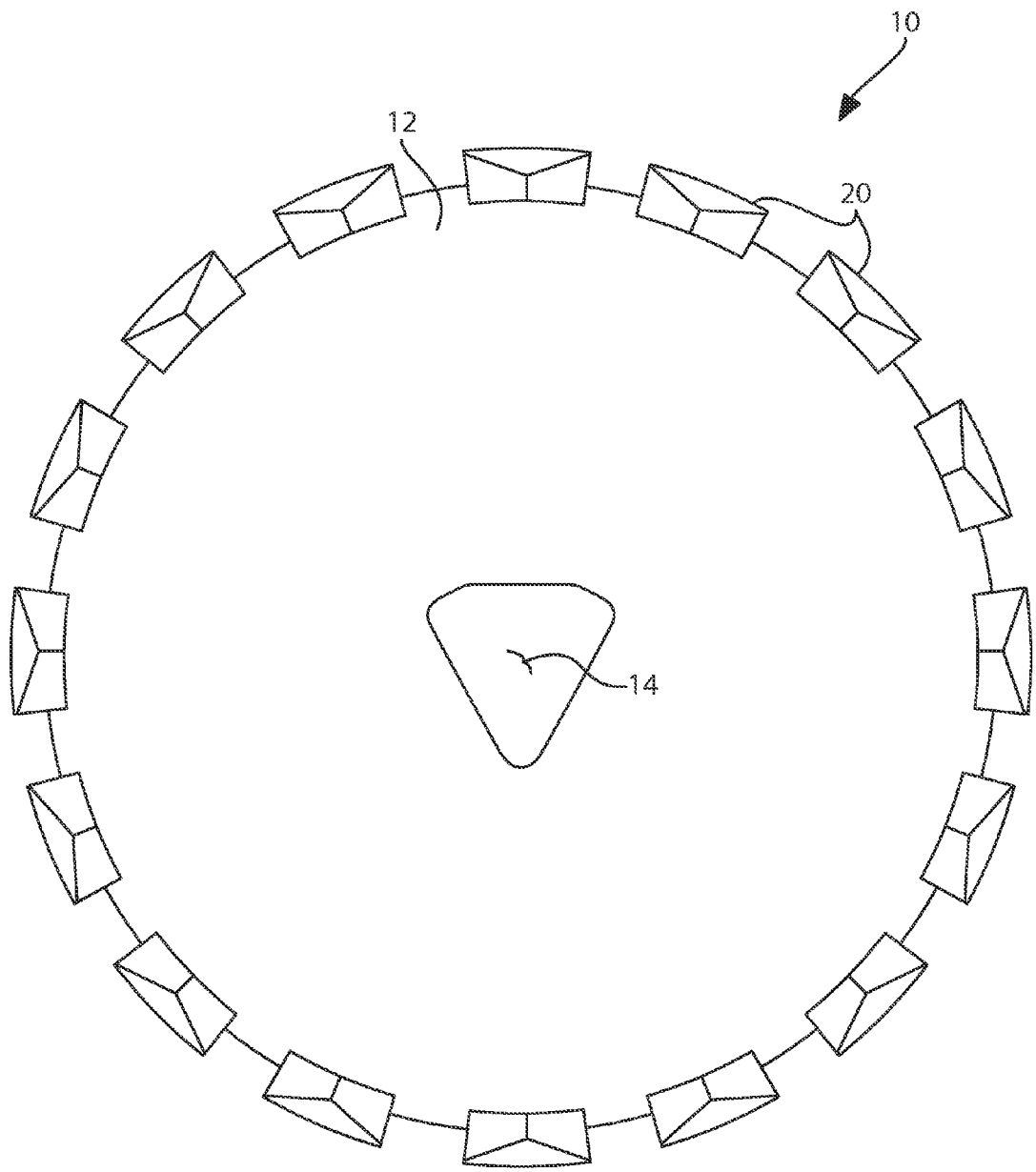
FIG. 1 is a fragmented perspective view of an exemplary embodiment of a cutting blade.

Referring to FIG. 1, a blade assembly 10 is shown. The blade assembly 10 has a circular metal blank 12 with an arbor hole 14 positioned in its center. The arbor hole 14 is shaped and sized to enable the blade assembly 10 to be attached to a traditional pavement cutting machine.

A plurality of cutting teeth 20 are symmetrically disposed around the circular metal blank 12. Each of the cutting teeth 20 is identical in shape, size and construction. The cutting teeth 20 are evenly distributed around the circular metal blank 12 so that the blade assembly 10 remains balanced, even at high rotating speeds.

Figure 2:
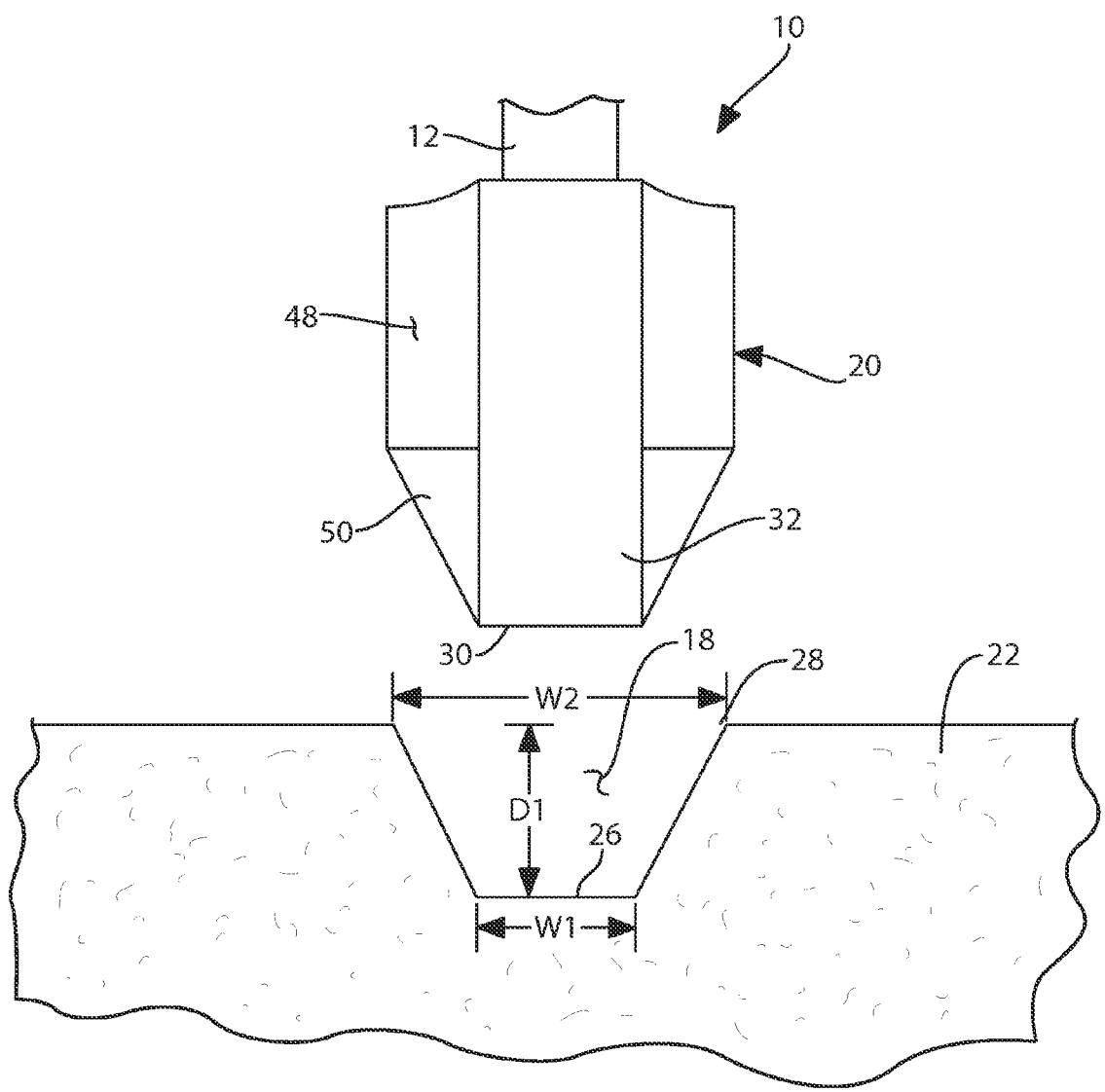
FIG. 2 shows an end view of a cutting tooth on a blade and a groove cut by the blade.

Referring to FIG. 2, it can be seen that the purpose of the blade assembly 10 is to cut a groove 18 that has a trapezoidal cross-sectional profile into the pavement 22 of a runway. For an airport runway, the desired groove 18 has a depth D1 of ¼ inch. The width W1 of the groove 18 at the bottom 26 of the groove 18 is also ¼ inch. However, the width W2 of the groove 18 at the top 24 is between 150% and 250% wider than the width W1 at the bottom 26. Consequently, the walls 28 defining the groove 18 diverge at an angle with respect to the vertical plane.

Each cutting tooth 20 has a complex shape. The cross-sectional shape of each cutting tooth 20 varies along the entire length of the cutting tooth 20. As will be explained, the purpose of the complex shape of each cutting tooth 20 is to ensure that the cutting tooth 20 cuts the desired trapezoidal shaped groove 18 as the cutting tooth 20 continues to wear away.

Figure 4:
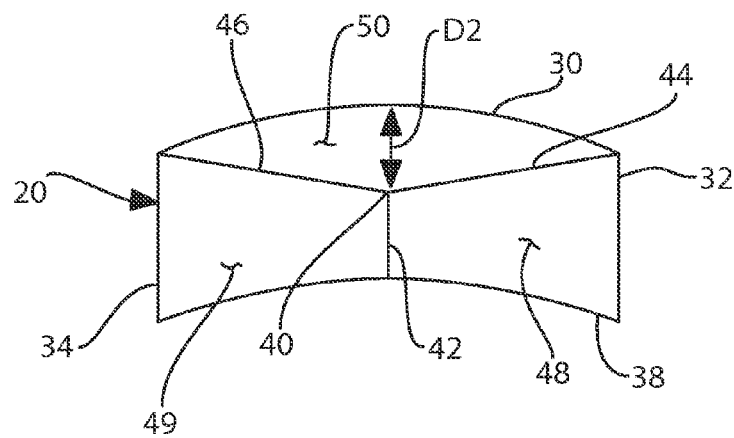
FIG. 4 shows a side view of a cutting tooth.
Figure 3:
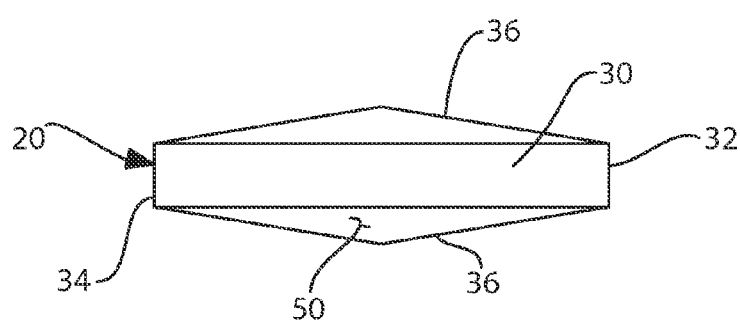
FIG. 3 shows a top view of a cutting tooth.

Referring to FIG. 3 and FIG. 4 in conjunction with FIG. 2, it can be seen that each cutting tooth 20 has the same complex shape. Each cutting tooth 20 has an outer peripheral edge surface 30 that is curved, wherein the curvature of the peripheral edge surface 30 is concentric with the curvature of the circular metal blank 12. The peripheral edge surface 30 is the surface of the cutting tooth 20 that lay the farthest from the center of the circular metal blank 12. The peripheral edge surface 30 has a width that is equal to the desired width W1 at the bottom of the groove 18 being cut.

Each cutting tooth 20 has a forward surface 32 and a rearward surface 34. Each cutting tooth 20 also has two contoured sides 36 that extend between the forward surface 32 and the rearward surface 34. Lastly, each cutting tooth 20 has a bottom edge 38 that faces the center of the circular metal blank 12. The forward surface 32 and the rearward surface 34 of the cutting tooth 20 have generally rectangular cross-sectional profiles. The width of the forward surface 32 and the rearward surface 34 is preferably equal to the width of the peripheral edge surface 30, and thus the width W1 of the bottom 26 of the groove 18 that is to be cut.

The contoured sides 36 of each cutting tooth 20 have a complex shape. A slope transition point 40 is located in the middle of each contoured side 36. The transition point 40 is located a distance D2 below the middle of the outer peripheral edge surface 30. The distance D2 is equal to the desired depth D1 of the groove 18 that is to be cut. A first transition line 42 extends from the transition point 40 to the middle apex of the bottom edge 38 of the cutting tooth 20. The cutting tooth 20 is at its thickest along the first transition line 42. The thickened area of the cutting tooth 20 along the first transition line 42 has a width equal to the desired width W2 of the top 24 of the groove 18 that is to be cut.

A second transition line 44 extends from the transition point 40 to the corner where the outer peripheral edge surface 30 meets the forward surface 32 of the cutting tooth 20. Likewise, a third transition line 46 extends from the transition point 40 to the corner where the outer peripheral edge surface 30 meets the rearward surface 34 of the cutting tooth 20. The three transition lines 42, 44, 46 divide each contoured side 36 of the cutting tooth 20 into three sloping surfaces. The first sloping surface 48 is defined by the forward surface 32, the bottom edge 38, the first transition line 42 and the second transition line 44. The cross-sectional thickness of the cutting tooth 20 at the first sloping surface 48 increases from its thinnest point at the forward surface 32 to its thickest point at the first transition line 42.

The second sloping surface 49 is defined by the rearward surface 34, the bottom edge 38, the first transition line 42, and the third transition line 46. The cross-sectional thickness of the cutting tooth 20 at the second sloping surface 49 decreases from its thickest point at the first transition line 42 to its thinnest point at the rearward surface 34.

The third sloping surface 50 is defined by the outer peripheral edge surface 30, the second transition line 44, and the third transition line 46. The cross-sectional thickness of the cutting tooth 20 is complex along the third sloping surface 50. The cross-sectional thickness increases from its thinnest point along the outer peripheral edge surface 30 to its thickest point at the transition point 40 where the second and third transition lines 44, 46 converge.

Figure 5:
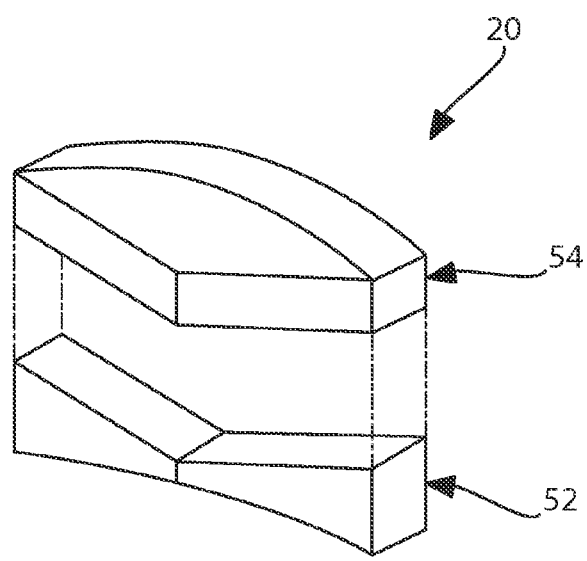
FIG. 5 shows an exploded, perspective view of a cutting tooth.

Referring to FIG. 5, it can be seen that each cutting tooth 20 has an inert base section 52 and a diamond impregnated cutting section 54. The complex shape of the cutting tooth 20 is reflected in both the shape of the inert base section 52 and the shape of the diamond impregnated cutting section 54. The diamond impregnated cutting section 54 is the only part of the cutting tooth 20 that actually cuts into pavement during use. The diamond impregnated cutting section 54 contains diamond particles and is, therefore, expensive. The use of the inert base section 52 prevents expensive diamond material from being used in the part of the cutting tooth 20 where it would serve no purpose. The use of the inert base section 52, therefore, greatly reduces the cost of the overall cutting tooth 20. Furthermore, the material of the inert base section 52 can be selected to optimize its ability to be welded or otherwise bonded to the selected material of the circular metal blank 12 (FIG. 1).

Referring back to FIG. 2, it will be understood that the part of the cutting tooth 20 that forms the bottom 26 of the groove 18 cuts longer and through more material than other parts of the cutting tooth 20. This fact is reflected in the design of the cutting tooth 20. The contoured sides 36 of the cutting tooth 20 are configured to wear in a manner that maintains the selected shape of the groove 18 as the cutting tooth 20 wears away. In this manner, although the cutting tooth 20 does wear, the wear is evenly distributed and the cross-sectional shape of the groove 18 being cut does not significantly change.

In the selected embodiment of the cutting tooth 20, the groove 18 that is created has a trapezoidal cross-section. It will be understood that other shapes can be created by varying the surfaces of the cutting tooth 20. For example, the walls 28 of the groove 18 and/or the bottom 26 of the groove 18 can be made to be curved. Furthermore, the angle of the walls 28 can be varied to any acute angle. All such variations, modifications and alternate embodiments are intended to be included within the scope of the present invention as defined by the claims.

What is claimed is:

1. A cutting blade for cutting a groove into pavement, wherein said groove has a depth between a bottom and a top and wherein said top of said groove is wider than said bottom of said groove, said cutting blade comprising;

a circular metal blank having an arbor mounting hole disposed therein, said circular metal blank having an outer rim;

a plurality of cutting tooth elements symmetrically affixed to said outer rim, each of said cutting tooth elements having a body defined between a forward surface, a rearward surface and a peripheral edge surface that extends between said forward surface and said rearward surface;

wherein said body varies in width between said forward surface and said rearward surface and has a maximum width in a thickened area between said forward surface and said rearward surface that is equal in width to said top of said groove; and wherein said peripheral edge surface is farthest from said outer rim and has a constant width equal to said bottom of said groove; and wherein said forward surface has a uniform width that is equal to that of said peripheral edge surface.

2. The cutting blade according to claim 1, wherein said rearward surface of said body has a uniform width that is equal to that of said peripheral edge surface.

3. The cutting blade according to claim 1, wherein said maximum width of said body occurs midway between said forward surface and said rearward surface.

4. The cutting blade according to claim 3, wherein said maximum width is disposed a first distance away from said peripheral edge surface, wherein said first distance is equal to said depth of said groove.

5. The cutting blade according to claim 3, wherein said peripheral edge surface has a curvature that is concentric with said circular metal blank.

6. The cutting blade according to claim 1, wherein said body has sloped side surfaces that extend from said thickened area to both said forward surface and said peripheral edge surface.

7. The cutting blade according to claim 6, further including additional sloped surfaces that extend from said thickened area to said rearward surface.

* * * * *